US012316187B2

United States Patent
Rudolf et al.

(10) Patent No.: US 12,316,187 B2
(45) Date of Patent: May 27, 2025

(54) ELECTROMAGNETIC ACTUATOR

(71) Applicant: PHYSIK INSTRUMENTE (PI) SE & CO. KG, Karlsruhe (DE)

(72) Inventors: Christian Rudolf, Karlsbad (DE); Bradley Engel, Plymouth, MA (US)

(73) Assignee: PHYSIK INSTRUMENTE (PI) SE & CO. KG (DE)

(*) Notice: Subject to any disclaimer, the term of this patent is extended or adjusted under 35 U.S.C. 154(b) by 0 days.

(21) Appl. No.: 18/893,389

(22) Filed: Sep. 23, 2024

(65) Prior Publication Data
US 2025/0105717 A1 Mar. 27, 2025

(30) Foreign Application Priority Data
Sep. 25, 2023 (EP) .................... 23199393

(51) Int. Cl.
*H02K 41/02* (2006.01)
*B25J 9/00* (2006.01)
*B25J 9/10* (2006.01)
*B25J 9/14* (2006.01)
*H02K 5/10* (2006.01)
*H02K 11/22* (2016.01)

(52) U.S. Cl.
CPC ............. *H02K 41/02* (2013.01); *B25J 9/003* (2013.01); *B25J 9/108* (2013.01); *B25J 9/144* (2013.01); *H02K 5/10* (2013.01); *H02K 11/22* (2016.01)

(58) Field of Classification Search
CPC ........... H02K 7/08; H02K 7/09; H02K 41/02; H02K 11/22; H02K 5/10; B25J 9/003; B25J 9/108; B25J 9/144
USPC .................................................. 310/90, 90.5
See application file for complete search history.

(56) References Cited

U.S. PATENT DOCUMENTS

| 5,098,203 | A  | * | 3/1992  | Henderson ......... F16C 32/0614 384/100 |
| 10,500,676 | B2 |   | 12/2019 | Candiloro et al. |
| 11,090,761 | B2 |   | 8/2021  | Candiloro et al. |
| 2001/0048257 | A1 |   | 12/2001 | Suzuki et al. |
| 2015/0123585 | A1 | * | 5/2015  | Yoshida ............. G01D 5/34792 310/68 B |
| 2020/0249469 | A1 | * | 8/2020  | Raab ........................ H02K 3/46 |
| 2021/0143721 | A1 |   | 5/2021  | Cipriani |
| 2023/0332666 | A1 | * | 10/2023 | Pu ........................... F16F 15/03 |

OTHER PUBLICATIONS

Extended European Search Report issued in EP 23199393.2, dated Mar. 15, 2024 (5 pages).

* cited by examiner

*Primary Examiner* — Alexander A Singh
(74) *Attorney, Agent, or Firm* — Harness, Dickey & Pierce, P.L.C.

(57) ABSTRACT

An electromagnetic actuator comprises two units, which, upon electromagnetic interaction, are configured to cause a guided movement relative to each other in translational and rotational directions with a bearing gap in between. The electromagnetic actuator is configured to supply compressed gas to the bearing gap to create a film of gas between the units constituting a frictionless floating bearing.

19 Claims, 5 Drawing Sheets

ELECTROMAGNETIC ACTUATOR

CROSS-REFERENCE TO RELATED APPLICATION

This application claims the benefit and priority of European Patent Application No. 23199393.2 filed on Sep. 25, 2023. The entire disclosure of the above application is incorporated herein by reference.

TECHNICAL FIELD

The present invention relates to an electromagnetic actuator with a frictionless floating bearing, and a positioning device, in particular a parallel kinematic positioning device, with such an electromagnetic actuator.

BACKGROUND

Known parallel kinematic positioning systems, in particular hexapod platforms, are used for moving and precision positioning, aligning and displacing loads in all six degrees of freedom, i.e., three linear and three rotational axes. Hexapods comprise six actuators acting together on a single moving platform.

In prior art hexapods, screw drive-based actuators are used to enable precise positioning. However, these systems often suffer from wear and tear when used in highly repetitive motion applications. Additionally, they do not offer high rates of acceleration and speed that is often needed, for example, in motion simulation applications.

U.S. Pat. Nos. 10,500,676 B2 and 11,090,761 B2 disclose an electromagnetic actuator with frictionless air bearing motion guidance for translational movement of a pre-objective in a laser beam focusing subsystem of a laser scanning system. However, these electromagnetic actuators only allow translational movements, but are prevented from rotational movement.

It would be preferable to provide an electromagnetic actuator which is capable of moving along a translational axis at high accelerations, while still being suitable for the use in parallel kinematic positioning systems, in particular hexapods.

SUMMARY

According to a first aspect, there is provided an electromagnetic actuator. The electromagnetic actuator comprises two units, which, upon electromagnetic interaction, are configured to cause a guide movement relative to each other in a translational direction and to cause or allow a guide movement relative to each other in a rotational direction. The two units have a bearing gap in between them. The electromagnetic actuator is configured to supply pressurized gas to the bearing gap to create a film of gas constituting a frictionless floating bearing between the units. The guided movement relative to each other in the rotational direction may be around the translational direction.

The passive rotary degree of freedom may simplify the actuation technology and overcomes limitations in the motion by removing a possible over constraint situation. An active rotary degree of freedom may increase the versatility of the electromagnetic actuator in terms of additional drive options.

One of the units may be a first unit and the other one of the units may be a second unit. The first unit may have a protrusion protruding into the second unit in said translational direction for guiding the movement of the second unit relative to the first unit in said translational and rotational directions. The second unit may constitute a bushing encompassing the protrusion of the first unit to define the bearing gap in between and/or may be concentrically arranged relative to the protrusion of the first unit. The second unit may have a closed end cap so as to build a piston with a piston chamber in combination with the first unit, with the piston chamber intended to be fed with pressurized gas, preferably through a piston chamber gas duct provided or formed in the protrusion.

The electromagnetic actuator may further comprise a gas supply device having a gas supply terminal and a gas-feed passage configured to feed pressurized gas, in particular air, from a gas source, in particular a compressor, to the gas supply terminal and via at least one nozzle gas duct from the gas supply terminal to at least one nozzle provided in one of the units. Preferably, the bushing comprises at least one nozzle for supplying the pressurized gas to the bearing gap. The gas supply terminal may form part of one of the units, preferably of the second unit. The at least one nozzle or the at least one nozzle gas duct may be provided or formed in the protrusion. It can be advantageous if the protrusion comprises an exhaust groove connected to an exhaust gas duct of the protrusion for exhausting the pressurized gas from the bearing gap or from the piston chamber.

One of the units, preferably the first unit, may comprise at least one magnet and the other one of the units, preferably the second unit, may comprise at least one coil, preferably a voice coil, interacting with the at least one magnet by electromagnetic interaction in response to activation of the at least one coil. The at least one magnet may be arranged in a housing of the first unit. The housing may be concentrically arranged with respect to the protrusion of the first unit outside the second unit.

The second unit may comprise or is built as a bobbin accommodating the at least one coil, which may be concentrically arranged outside the protrusion of the first unit or which may protrude into a recess of the housing having a hollow cylindrical symmetry, with the housing accommodating the at least one magnet. The second unit may comprise a sleeve concentrically arranged outside the bobbin for covering at least a part of an exterior surface of the bobbin to provide a sleeve gap in between. The electromagnetic actuator may be configured to supply compressed gas to the sleeve gap, in particular for cooling the bobbin or the at least one coil accommodated by the bobbin. The bobbin may also accommodate the gas supply terminal.

The sleeve may be rotationally affixed to the bobbin, preferably by means of at least two O-rings, in particular elastic O-rings, which generate a clamping force between the bobbin and the sleeve. The O-rings may be arranged at a distance from one another in the translational direction so that the sleeve gap may be sealed in the translational direction by the O-rings.

Alternatively, or additionally, the sleeve may be rotationally affixed to the inner sleeve by gluing or welding.

The electromagnetic actuator may comprise a power supply device having a power supply terminal and a power supply line configured to feed electric power from an energy source to the power supply terminal. The power supply terminal may be connected to the at least one coil for powering same.

The units may be configured to restrict the translational movement and/or rotational movement relative each other. A predefined angular range $\phi$ of the rotational movement of the units relative to each other may be in between 10 to 350 degrees, preferably in between 40 to 320 degrees, most preferably in between 140 to 220 degrees. Each of the units may comprise a stopper and the stoppers may be configured to enter into an abutment so as to restrict translational movement and/or rotational movement of the two units relative to each other to a predefined translational and angular range $\phi$, respectively.

The electromagnetic actuator may comprise an encoder, preferably an optical encoder for encoding the relative position of the two units in at least one of said translational and rotational directions. The encoder may be a linear, incremental or absolute encoder.

The encoder may comprise at least one optical sensor provided on one of said units, preferably the first unit. The encoder may further comprise at least one encoder scale provided on the other one of said units, preferably the second unit. The encoder scale may be a grating with detectable lines running along at least one of said translational and rotational directions. The optical sensor may be configured to read the at least one encoder scale for encoding the relative position of the two units. The encoder may comprise a first sensor configured to interact with a first encoder scale embodied as a grating having lines running in the rotational direction so as to detect the relative translational position of the units. The encoder may instead or additionally comprise a second sensor configured to interact with a second encoder scale embodied as a grating having lines running in the translational direction so as to detect the relative rotational position of the units.

The first grating and the second grating may be integrally realized to form a 2D-grid on a cylindrical surface, preferably on the outer surface of the sleeve of the second unit or on the outer surface of the bobbin. The second sensor may be located at an angle of approximately 90 degrees in the rotational direction offset from the first sensor.

Alternatively, the encoder may have any of a linear variable differential transformer (LVDT) sensor, a magnetic sensor, an interferometry sensor, and a capacitive sensor.

The electromagnetic actuator may comprise a controllable valve configured to control gas pressure in the piston chamber. The valve may be controlled based on an external load acting on one of the units, preferably the second unit, during operation of the electromagnetic actuator in order to generate a counterbalance force to the respective unit such to carry static or passive loads. The controllable valve may be an electronic proportional valve.

The electromagnetic actuator may further comprise a locking unit for locking the units relative to each other against movement in at least one of the translational and rotational directions. The locking unit may comprise an expandable collet provided on one of the units, preferably the second unit, and a corresponding opening at the other one of the units, preferably the first unit, for receiving an expendable distal end of the extendable collet to lock at least translational movement of the second unit relative to the first unit.

The locking unit may be adjustable via the controllable valve during operation of the actuator by reducing pressure in the expanding collet, so that a force may be provided by a spring pushes the expandable collet together back to the locked position, thereby providing an internal brake for locking the position of the second unit relative to the first unit.

One of the units, preferably the first unit, may form a stator and the other one of the units, preferably the second unit may form a runner or rotor.

According to a second aspect, there is provided a motion or positioning device comprising a base, a positioning platform and at least one electromagnetic actuator as described above. One of the units is directly or indirectly connected to the base and the other one of the units is directly or indirectly connected to the positioning platform. The motion or positioning device may be a parallel kinematic device, preferably a hexapod.

TERMS AND DEFINITIONS

The term 'translational direction T' includes opposite directions along a translational axis and preferably any parallel direction.

The term 'rotational direction R' includes opposite directions around the translational axis, in particular along a circular line centered on/concentrically arranged with respect to the translational axis, and preferably any parallel direction.

The term 'translational movement' includes movements along a translational axis in forward and backward directions.

The term 'rotational movement' includes movements along a circular line concentrically to the translational axis in both directions.

The term 'or' used herein is—unless explicitly stated otherwise—generally to be understood as an inclusive 'or'. For example: the expression 'feature A or feature B' shall cover solely feature A or solely feature B or the combination of features A and B.

BRIEF DESCRIPTION OF DRAWINGS

FIG. 2A depicts the electromagnetic actuator in an extended state and view FIG. 2B depicts the electromagnetic actuator in a retracted or locked and rotated state. It shall be emphasized that there is no dependency between the rotational movement and the translational movement, i.e., both movements can be performed independently.

DETAILED DESCRIPTION OF THE PREFERRED EMBODIMENTS

Figure 1:
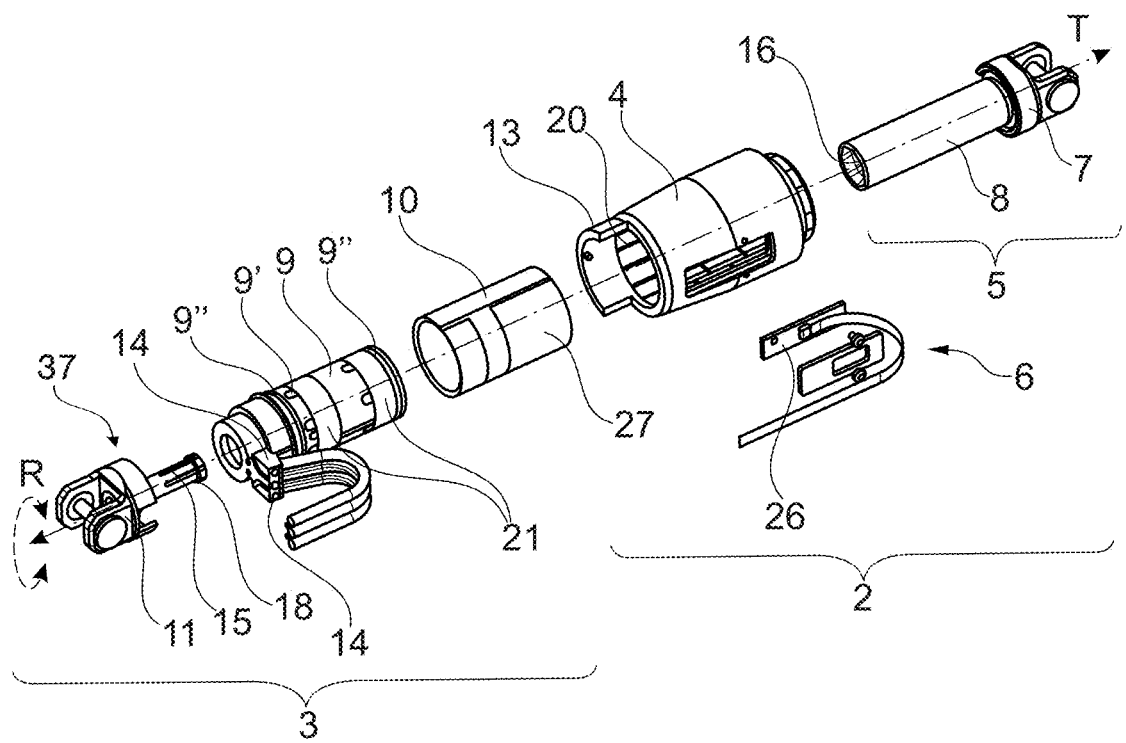
FIG. 1 shows a computer-generated exploded perspective view of the electromagnetic actuator representing the first embodiment of the present invention.
Figures 2A, 2B:
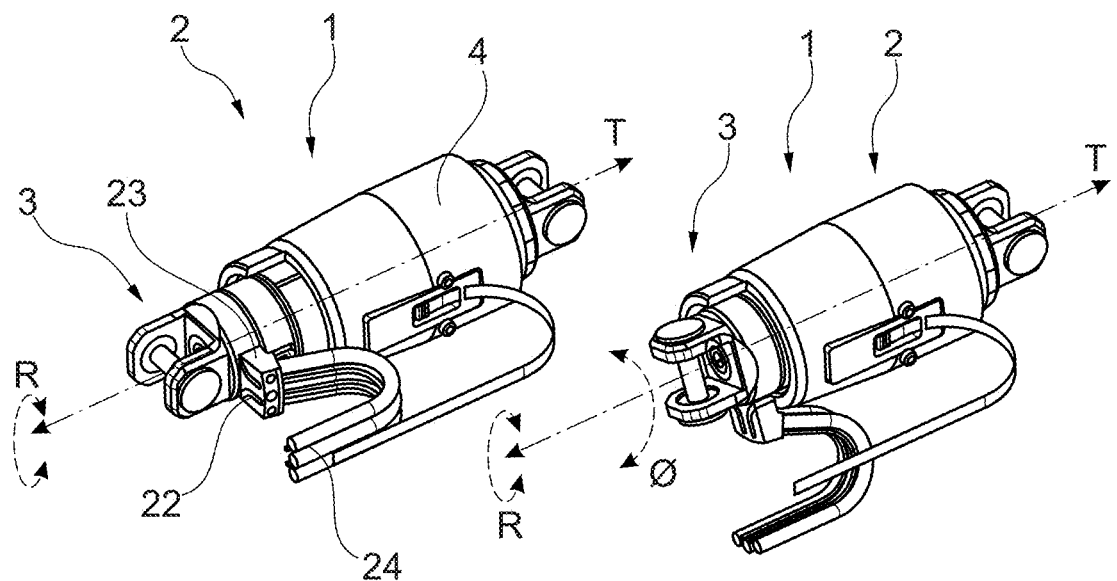
FIGS. 2A and 2B show computer-generated perspective views of the electromagnetic actuator according to FIG. 1 from different view angles and in different states, wherein view
Figure 3:
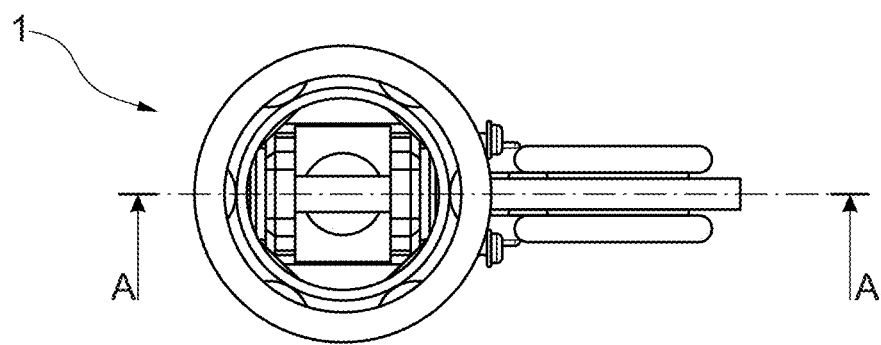
FIG. 3 shows a top view of the electromagnetic actuator of FIGS. 1 and 2.

An electromagnetic actuator is described in conjunction with translational movement and rotational movement of a motion axis in a parallel-kinematic moving or positioning device, preferable in a hexapod. The electromagnetic actuator may instead or in addition be used in other motion or positioning systems as well as in motion axis devices that repeatedly require rapid translational movements of objects or elements to be moved or positioned, respectively.

Referring to FIGS. 1 to 4, a two degree of freedom (2DOF) electromagnetic actuator according to the invention is illustrated, which provides closed loop translational positioning and passive rotary motion guided by air bearings.

The electromagnetic actuator 1 includes a rotor (first unit) 2 and a stator (second unit) 3. The rotor 2 encompasses the stator 3 to enable movement relative to each other in both a translational direction T and rotational direction R, around the translational direction T.

A bearing gap 35 is provided in between the rotor 2 and the stator 3. During operation of the electromagnetic actuator according to the invention, the bearing gap 35 is supplied with pressurized gas, in particular pressurized air, to create a film of gas constituting a frictionless floating bearing between the rotor 2 and the stator 3.

The rotor 2 comprises a housing 4, a protrusion 5, and an encoder 6. The protrusion 5 serves, amongst others, as a magnetic centre pole and is provided on a distal end of the housing 4. The protrusion 5 includes an end cap in form of a joint 7 that is intended to be connected to an element to be moved or positioned, for example the platform of a hexapod. In an assembled state, the end cap affixes the protrusion 5 to a distal end of the housing 4, for example, by means of screw connection or snap fit connection. The protrusion is preferably made of magnetic steel.

The protrusion 5 has a protruding portion 8 in form of a cylinder and protrudes into the stator 3 in the translational direction T for guiding the movement of the stator 3 relative to the rotor 2.

The stator 3 constitutes an air bearing bushing in form of a bobbin comprising two coils 21 that are attached to the exterior surface of the bobbin 9 separated from each other in the translational direction T. The bobbin 9 is concentrically arranged outside the protruding portion 8 of the protrusion 5.

A sleeve 10 of the stator 3 in form of an outer, cylindrical, sleeve is concentrically arranged outside the bobbin 9 and covers at least a part of an exterior surface of the bobbin 9 and of the coils 21 attached to the bobbin, thereby providing a sleeve gap 36 in between. The bobbin comprises several nozzles 9' configured to supply pressurized gas via nozzle gas ducts (not shown) provided in the bobbin and being conductively connected with the gas supply terminal 22 to the sleeve gap 36 and to the bearing gap 35. The bobbin 9 may be made of aluminium, preferably hard anodized aluminium, or brass, or any combination thereof. In particular, both, the sleeve gap 36 and the bearing gap 35 are filled with the pressurized gas, in particular pressurized air, supplied from a same source so as to create a film of gas constituting a frictionless floating bearing in the bearing gap 35 while providing circulation of gas in between the sleeve gap 36 and the bearing gap 35, mainly in order to cool the coils 21 arranged to the outer surface of the bobbin, respectively.

The sleeve 10 is rotationally affixed to the exterior surface of the bobbin 9, preferably by means of at least two elastic O-rings 9", which generate a clamping force between the bobbin 9 and the sleeve 10. The O-rings 9" are arranged at a distance from one another in the translational direction T so that the sleeve gap 36 is sealed in the translational direction T by the O-rings 9". Alternatively, or additionally, the sleeve 10 is rotationally affixed to the exterior surface of the bobbin 9 by gluing or welding. This may prevent a loosening of the connection due to aging of the O-rings 9".

A closed end cap in form of a joint 11 intended to be connected to a stationary base element, for example to the base plate of a hexapod, is provided on a distal end of the stator 3, away from the rotor 2, so as to build a piston 37 with a piston chamber 12 in combination with the rotor 2.

Each of the rotor 2 and the stator 3 comprises a stopper 13, 14. The stoppers 13, 14 are configured to enter into abutment so as to restrict translational movement and/or rotational movement of the rotor 2 and the stator 3 relative to each other to a predefined translational and angular range φ, respectively.

Regarding the restriction of the rotational movement R, the housing 4 of the rotor 2 is provided with a stopper 13 realized by an unclosed perimeter wall extending from a distal end of the housing 4. The open portion of the unclosed perimeter wall receives a stopper 14 realized by an abutment provided on the bobbin 9, in order to restrict rotational movement of the rotor 2 to a predefined angular range φ, preferably in at least a translationally retracted state (see FIGS. 2A, 2B, and 4) of the bobbin 9. The stoppers 13, 14 are designed to allow a rotational movement R to an angular range φ in between 10 to 350 degrees, preferably in between 40 to 320 degrees, most preferably in between 140 to 220 degrees.

A locking unit for locking the rotor 2 and the stator 3 relative to each other against movement in the translational direction T is also provided in electromagnetic actuator 1. In the present embodiment, the locking unit is a non-permanent cantilever snap-fit connection. In particular, the locking unit comprises an expandable collet 15 affixed to the joint 11 of the stator 3 and a corresponding opening, in particular realized by drill holes 16, 17 with at least two different diameters along the translational direction T, in the centre of the protruding portion 8 of the protrusion 5. In the retracted/locked position, the expendable distal end 18 of the extendable collet 15 is received in the opening and snaps out at the transition from the first drill hole 16 with a smaller diameter to the second drill hole 17 with a larger diameter so as to lock the translational movement of the rotor 2 with respect to the stator 3.

The locking unit is adjustable via a controllable valve (not shown) during operation of the electromagnetic actuator 1 to provide an internal brake for locking the translational position of the rotor 2 relative to the stator 3. To transit the rotor 2 to the locked position, pressure in the expanding collet 15 and the piston chamber 12 is reduced, so that a force provided by a spring 19 pushes the expandable collet 15 back to the locked/retracted position.

The controllable valve may be an electronic proportional valve configured to control gas pressure in the piston chamber 12. In the present embodiment, the controllable valve is located outside the electromagnetic actuator 1. In other embodiments, the controllable valve forms part of the electromagnetic actuator 1. For example, the controllable valve may be provided on the bobbin 9.

Figure 4:
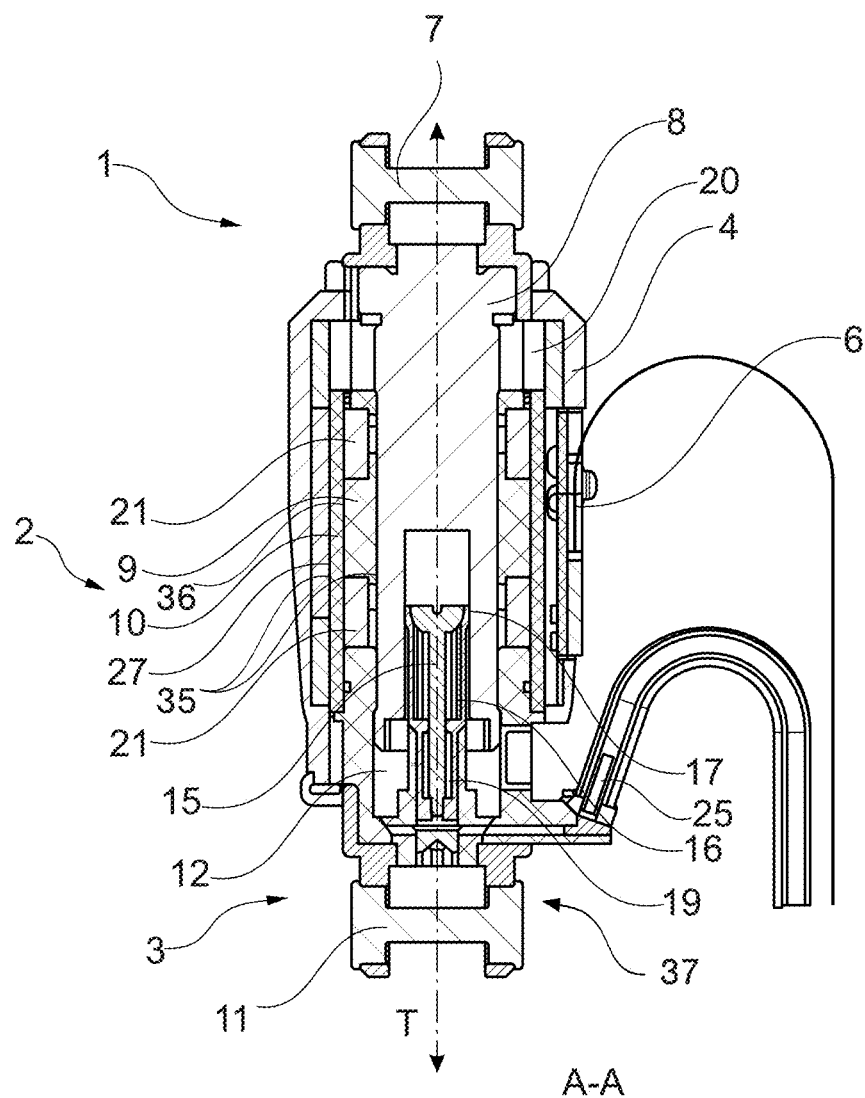
FIG. 4 shows a longitudinal cross-sectional view of the electromagnetic actuator along line A-A as defined in FIG. 3.

Referring to FIGS. 1 and 4, several permanent magnets 20 are provided on the inner surface of the housing 4 of the rotor 2 in a circumferential manner. Two coils 21 are provided on the exterior surface of the bobbin 9. The coils 21 interact with the magnets 20 in response to activation of the coils 21 in order to generate a translational and/or rotational movement of the stator and the rotor relatively against each other.

The bobbin 9 comprises a gas supply terminal 22 for interacting with a gas supply device 23 and gas supply line/passage 24 configured to feed pressurized gas from a gas source to the gas supply terminal 22. In the present embodiment, the gas supply terminal 22 is not solely supplied with both pressurized gas, in particular pressurized air, for the bearing gap 35 and/or the sleeve gap 36, but additionally with electrical energy for the coils for powering same in order to interact with the magnets 20. The gas supply device 23 comprises at least one nozzle 25 for supplying the pressurized gas to the bearing gap 35 between the stator 3 and the rotor 2 and/or to the sleeve gap 36 for cooling reasons via at least one nozzle gas duct provided in the bobbin 9 with the pressurized gas exhausting through the nozzles 9'. The pressurized gas is provided from a compressor. The electrical energy is provided from a power grid, for example, from the public electricity grid.

Referring back to FIG. 1, the housing 4 of the rotor 2 comprises an opening for receiving the optical encoder 6 for encoding the relative position of the stator 3 and the rotor 2 in at least one of said translational and rotational directions T, R. The optical encoder 6 comprises at least one optical sensor 26 that interacts with at least one encoder scale 27 provided on the outer surface of the sleeve 10. Preferably, the encoder scale 27 is a grating with detectable lines running along at least one of said translational and rotational directions T, R, wherein the optical sensor 26 is configured to read the at least one encoder scale 27 for encoding the relative position of the stator 3 relative to the rotor 2. The encoder 6 is a linear encoder, preferably one of an incremental or absolute encoder. The encoder scale may be made of aluminium, stainless steel and/or biaxially-oriented polyethylene terephthalate.

Preferably, there is provided a first optical sensor 26 configured to interact with a first encoder scale 27 embodied as a grating having parallel lines/rings running in the rotational direction so as to detect the relative translational position between the stator 3 and the rotor 2; and a second sensor 26 configured to interact with a second encoder scale 27 embodied as a grating having parallel lines running in the translational direction so as to detect the relative rotational position between the stator 3 and the rotor 2.

In other embodiments, the first grating and the second grating are integrally realized to form a 2D-grid. The second sensor 26 is located at an angle of approximately 90 degrees in the rotational direction offset from the first sensor 26.

Figure 5:
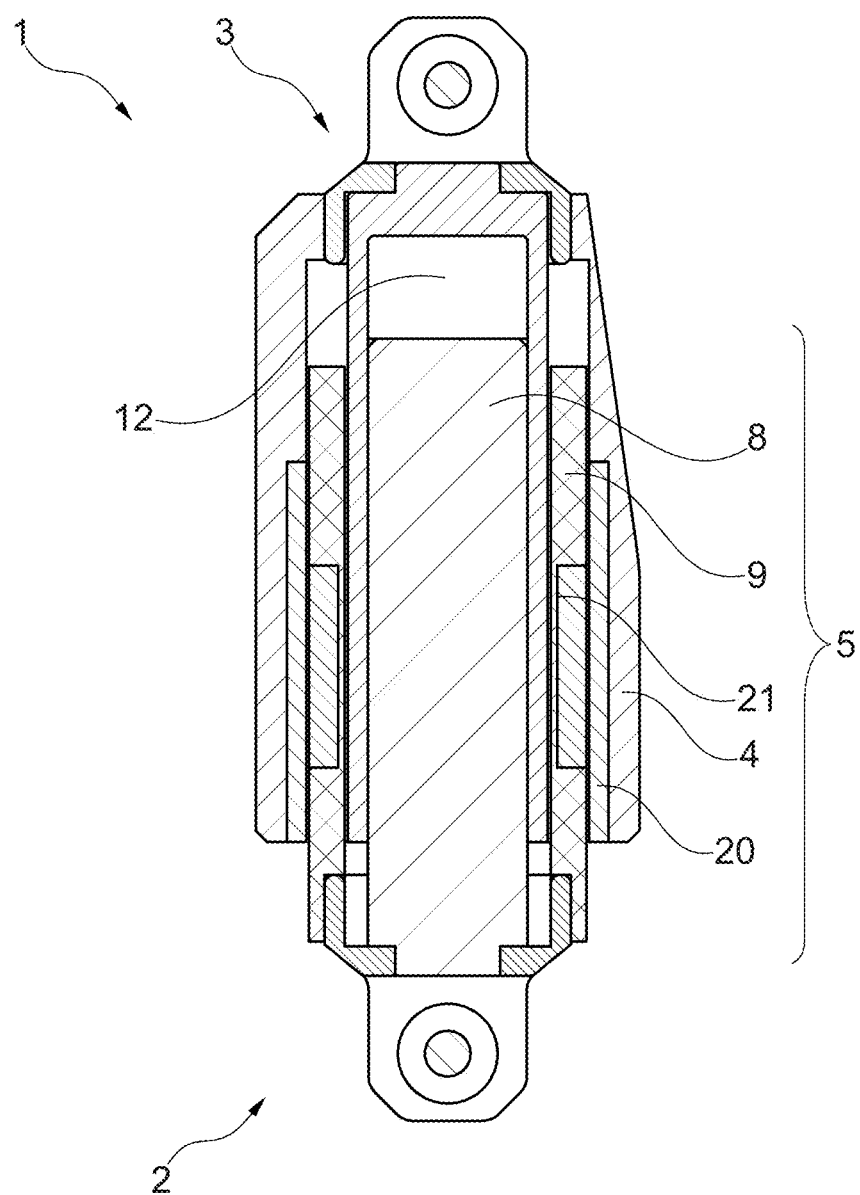
FIG. 5 shows a cross-sectional view of an electromagnetic actuator according to a second embodiment of the present invention.

FIG. 5 shows a second embodiment of an electromagnetic actuator 1 according to the invention in a cross-sectional view. Here, some details of the electromagnetic actuator shown in FIGS. 1 to 4—that are in fact identically or at least similarly contained in the electromagnetic actuator according to the second embodiment—are omitted for reasons of clarity or simplicity, respectively. Furthermore, the second embodiment of the electromagnetic actuator according to FIG. 5 will described in the following solely with regard to the differences to the first embodiment according to FIGS. 1 to 4.

The protrusion 5 of the first unit 2 of the electromagnetic actuator 1 is encompassed or surrounded by an inner wall part of the second unit 3 defining an inner hollow cylindrical part or a bushing. Said inner wall part serving as a magnetic centre pole and as an air bearing surface, and is made from magnetic steel. The protrusion 5 or its protruding portion 8, respectively, is made from aluminium and serves as an air bearing shaft and has nozzles (not shown) for the outlet of the compressed gas guided to the nozzles via nozzle gas ducts within the protruding portion 8 (also not shown), thus creating a film of compressed gas between the protrusion 5 and the air bearing surface in a corresponding air bearing gap.

Arranged at or attached to the first unit 2 is the bobbin 9 made from aluminium. The bobbin 9 accommodates a coil 21. The bobbin 9 protrudes into a further (outer) hollow cylindrical portion of the second unit 3 that is arranged between the inner wall part defining the inner hollow cylindrical part and an outer wall part of the second unit 3. The outer wall part of the second unit 3 accommodates several circumferentially arranged permanent magnets 20 and is made from magnetic steel constituting a housing 4 or at least a housing part of the second unit 3. The permanent magnets 20 are intended for interaction with the coil 21 upon electrical excitation with a magnetic gap therebetween.

The piston chamber 12 is fed by pressurized gas for counterbalancing reasons via a separate piston chamber gas duct (not shown) preferably provided in the protruding portion 8 of protrusion 5 having an outlet or a nozzle at the end portion of the protruding portion 8 adjacent the piston chamber 12.

An exhaust groove (not shown) is circumferentially provided near to but spaced from the end portion of the protruding portion 8 for exhausting pressurized gas from the air bearing gap as well as from the piston chamber 12 with said exhaust groove being conductively connected to an exhaust gas duct (not shown).

Figure 6:
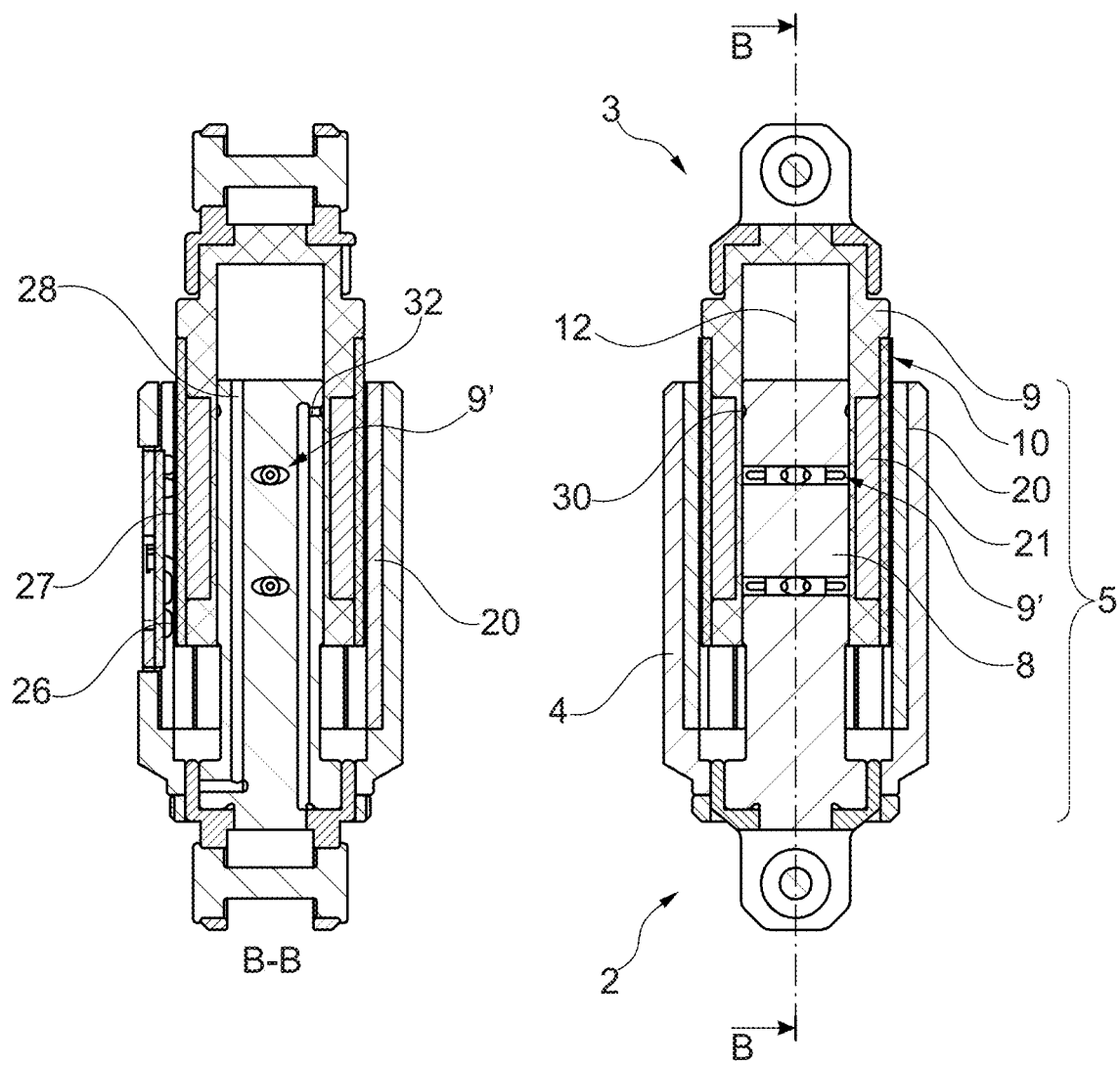
FIG. 6 shows two different cross-sectional views of an electromagnetic actuator according to a third embodiment of the present invention.

FIG. 6 shows a third embodiment of an electromagnetic actuator 1 according to the invention in two different cross-sectional views. Here again, some details of the electromagnetic actuator shown in FIGS. 1 to 4—that are in fact identically or at least similarly contained in the electromagnetic actuator according to the third embodiment—are omitted for reasons of clarity or simplicity, respectively. Furthermore, the third embodiment of the electromagnetic actuator according to FIG. 6 will be described in the following solely with regard to the differences to the first embodiment according to FIGS. 1 to 4.

The protrusion 5 or the protruding portion 8 of the first unit 2 of the electromagnetic actuator 1 is encompassed or surrounded by a part of the second unit 3 substantially formed as a hollow cylinder or a cylindrical bushing that is made from aluminium. Said hollow cylindrical part of the second unit 3 accommodates a coil 21 in a circumferential manner, thus establishing a bobbin 9. In addition, the second unit 3 accommodates a cylindrical sleeve 10 arranged in a coaxial manner at its outer part with the surface of the sleeve 10 flushing with the surface of the second unit 3 adjacent the sleeve. The sleeve 10 accommodates an encoder scale 27 for interaction with a corresponding optical sensor 26.

The protrusion 5 or its protruding portion 8, respectively, serves as a magnetic centre pole and as an air bearing shaft having nozzles 9' for the outlet of the compressed gas guided to the nozzles via nozzle gas ducts (not shown) within the protruding portion 8. The second unit 3 or its hollow cylindrical part encompassing the protruding portion 8 serves as an air bearing bushing and being complementary to the air bearing shaft realized by the protruding portion 8, with the compressed gas or air exhausting the nozzles 9' and directed to the air bearing gap between the air bearing bushing and the air bearing gap leading to a film of compressed gas therebetween.

Arranged at or attached to the second unit 3 is a housing part or a housing 4 made from magnetic steel and accommodating several permanent magnets 20 circumferentially arranged within the housing 4 and surrounding or encompassing the coil 21 of the bobbin 9. Furthermore, the housing 4 surrounds or encompasses a major part of the sleeve 10 and accommodates the optical sensor 26 that interacts with the encoder scale 27 attached to or integrally formed with the sleeve 10. It is possible to make the housing 4 or housing portion an integral part of the second unit 3.

The end portion of the bobbin 9 of the second unit 3 forms together with the end portion of the protruding portion 8 of the protrusion 5 a piston chamber 12. Said piston chamber 12 is fed by pressurized gas for counterbalancing reasons via a separate piston chamber gas duct 28 provided in the protruding portion 8 having an outlet or a nozzle at the end portion of the protruding portion 8 adjacent the piston chamber 12. An exhaust groove 30 is provided in a circumferential manner near to but spaced from the end portion of the protruding portion 8 for exhausting pressurized gas from the air bearing gap as well as from the piston chamber 12 with said exhaust groove being conductively connected to an exhaust gas duct 32.

At the respective end portion of the first unit 2 and the second unit 3, a corresponding joint 7 or 11, respectively, for connection with a further element, for example an element to be moved or positioned or a stationary base element, is arranged.

Figure 7A:
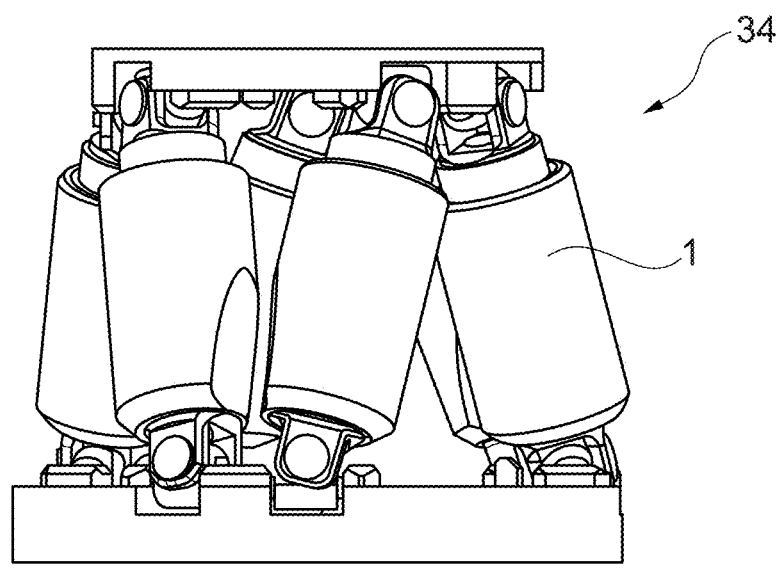
FIG. 7A shows a front view and FIG. 7B shows a perspective view of a hexapod with six electromagnetic actuators according to the present invention.
Figure 7B:
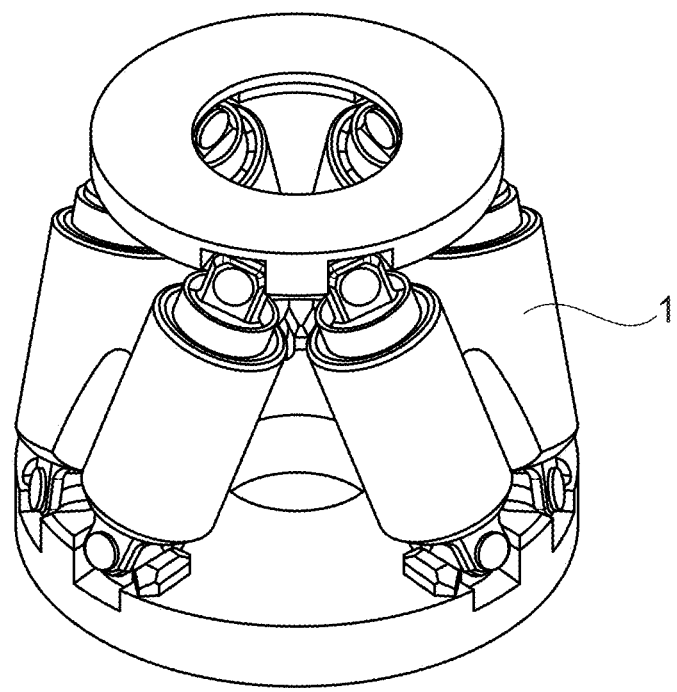

FIG. 7 shows in two different views a parallel kinematic positioner 34 in form of a hexapod containing six of the electromagnetic actuators 1 as described before.

The invention claimed is:

1. An electromagnetic actuator comprising two units, which, upon electromagnetic interaction, are configured to cause a guide movement relative to each other in a translational direction and to cause or allow a guide movement relative to each other in a rotational direction, around the translational direction, with a bearing gap in between, wherein the electromagnetic actuator is configured to supply pressurized gas to the bearing gap to create a film of gas constituting a frictionless floating bearing between the two units, wherein a predefined angular range of the movement in the rotational direction of the two units relative to each other is between 10 to 350 degrees.

2. The electromagnetic actuator according to claim 1, wherein one of the units is a first unit and the other one of the units is a second unit, wherein the first unit has a protrusion protruding into the second unit in said translational direction for guiding the movement of the second unit relative to the first unit in said translational and rotational directions, wherein the second unit constitutes a bushing encompassing the protrusion of the first unit to define the bearing gap in between and/or is concentrically arranged relative to the protrusion of the first unit, wherein the second unit has a closed end cap so as to build a piston with a piston chamber in combination with the first unit, the piston chamber being configured to be fed by pressurized gas, in particular air.

3. The electromagnetic actuator according to claim 2, wherein the actuator further comprises a gas supply device having a gas supply terminal and a gas-feed passage configured to feed pressurized gas, in particular air, from a gas source, in particular a compressor, to the gas supply terminal and via at least one nozzle gas duct from the gas supply terminal to at least one nozzle provided in one of the units, the at least one nozzle being configured for supplying the pressurized gas to the bearing gap, wherein the gas supply terminal forms part of one of the units.

4. The electromagnetic actuator according to claim 3, wherein the at least one nozzle or the at least one nozzle gas duct is provided in the protrusion.

5. The electromagnetic actuator according to claim 3, wherein the protrusion comprises an exhaust groove connected to an exhaust gas duct of the protrusion configured to exhaust pressurized gas from the bearing gap and the piston chamber.

6. The electromagnetic actuator according to claim 3, wherein the actuator further comprises a locking unit for locking the units relative to each other against movement in at least one of the translational and rotational directions, wherein the locking unit comprises an expandable collet provided on one of the units, and a corresponding opening at the respective other one of the units, for receiving an expendable distal end of the expandable collet to lock at least translational movement of one of the units relative to the respective other of the units, and with the locking unit configured to be fed by pressurized gas from the gas supply device.

7. The electromagnetic actuator according to claim 6, wherein the locking unit is adjustable via a controllable valve during operation of the actuator by reducing pressure in the expandable collet, so that a force provided by a spring pushes the expandable collet together back to the locked position, thereby providing an internal brake for locking the position of one of the units relative to the respective other of the units.

8. The electromagnetic actuator according to claim 3, wherein the piston chamber is configured to be fed by pressurized gas from the gas supply device, through a piston chamber gas duct provided in the protrusion, where the pressure of the pressurized gas within the piston chamber is adjustable via an electronic proportional valve.

9. The electromagnetic actuator according to claim 2, wherein one of the units comprises at least one magnet and the other one of the units comprises at least one voice coil, interacting with the at least one magnet by electromagnetic interaction in response to activation of the at least one voice coil, wherein the at least one magnet is arranged in a housing of one of the units, which is concentrically arranged with respect to the protrusion of the first unit.

10. The electromagnetic actuator according to claim 9, wherein the second unit comprises or is designed as a bobbin that is concentrically arranged with respect to the protrusion, and with the bobbin accommodating the at least one voice coil.

11. The electromagnetic actuator according to claim 10, wherein the bobbin protrudes into a recess of the housing having a hollow cylindrical symmetry, and with the housing accommodating the at least one magnet.

12. The electromagnetic actuator according to claim 10, wherein a sleeve is concentrically arranged outside the bobbin for covering at least a part of an exterior surface of the bobbin to provide a sleeve gap in between, wherein the at least one voice coil is arranged between the bobbin and the sleeve.

13. The electromagnetic actuator according to claim 12, wherein the sleeve is rotationally affixed to the bobbin, by means of at least two O-rings, in particular elastic O-rings, which generate a clamping force between the bobbin and the sleeve, wherein the O-rings are arranged at a distance from one another in the translational direction so that the sleeve gap is sealed in the translational direction by the O-rings.

14. The electromagnetic actuator according to claim 1, wherein the units are configured to restrict the translational movement and/or rotational movement relative each other, wherein a predefined angular range of the rotational movement of the units relative to each other is in between 140 to 220 degrees, wherein each of the units comprises a stopper and the stoppers are configured to enter into abutment so as to restrict translational movement and/or rotational movement of the two units relative to each other to a predefined translational and angular range, respectively.

15. The electromagnetic actuator according to claim 1, wherein the actuator comprises an optical encoder for encoding the relative position of the two units in at least one of said translational and rotational directions, wherein the encoder is a linear, incremental or absolute encoder.

16. The electromagnetic actuator according to claim 15, wherein said optical encoder comprises at least one optical sensor provided on one of said units, and at least one encoder scale provided on the respective other one of said units, wherein the encoder scale is a grating with detectable lines running along at least one of said translational and rotational directions, wherein the optical sensor is configured to read the at least one encoder scale for encoding the relative position of the two units, wherein there is a first sensor configured to interact with a first encoder scale embodied as a grating having lines running in the rotational direction so as to detect the relative translational position of the units and a second sensor configured to interact with a second encoder scale embodied as a grating having lines running in the translational direction so as to detect the relative rotational position of the units.

17. The electromagnetic actuator according to claim 1, wherein one of the units forms a runner or rotor and the other one of the units forms a stator.

18. A positioning device comprising a base, a positioning platform and at least one electromagnetic actuator according to claim 1, wherein one of the units is connected to the base and the other one of the units is connected to the positioning platform.

19. The positioning device according to claim 18, wherein the positioning device comprises a hexapod having six electromagnetic actuators.

* * * * *